Jan. 8, 1929.
L. A. HAZELTINE
1,698,364
MEANS FOR ELIMINATING MAGNETIC COUPLING
Original Filed April 7, 1924    2 Sheets-Sheet 1
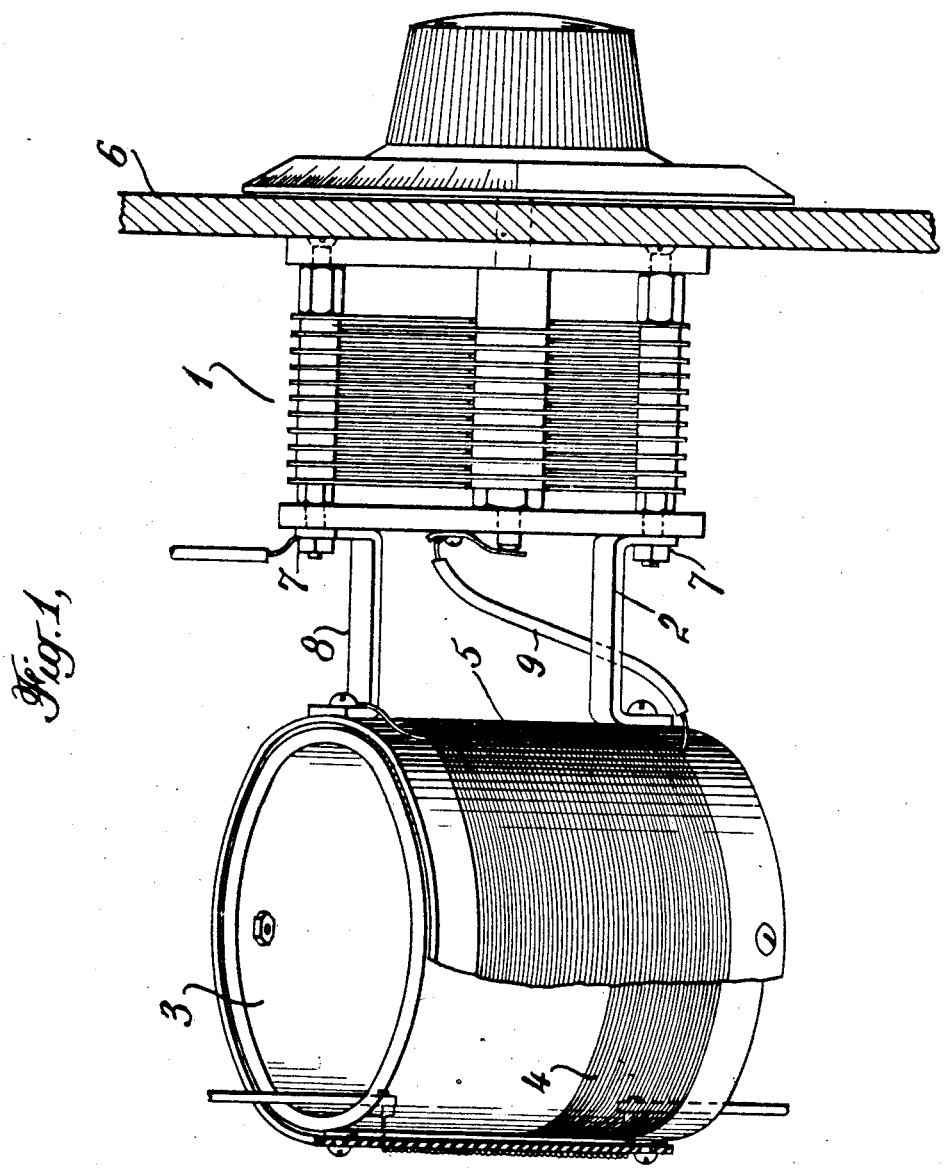
INVENTOR
Louis A. Hazeltine
BY
Pennie, Davis, Marvin and Edmonds
ATTORNEYS Jan. 8, 1929.
L. A. HAZELTINE
1,698,364
MEANS FOR ELIMINATING MAGNETIC COUPLING
Original Filed April 7, 1924   2 Sheets-Sheet 2
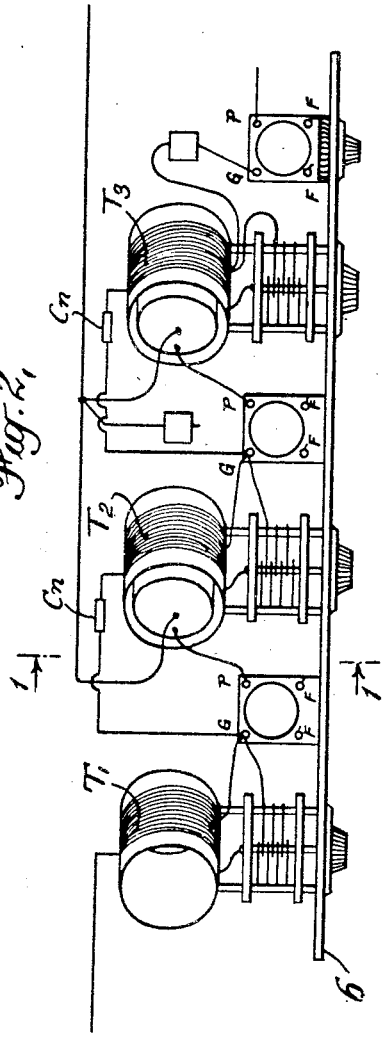
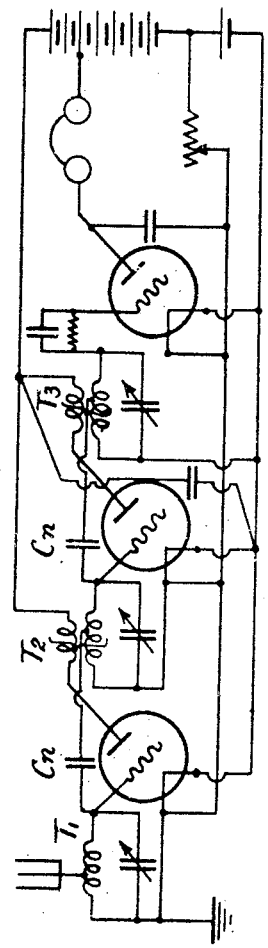
INVENTOR
Louis A. Hazeltine
BY
Pennie, Davis, Marvin and Edmonds,
ATTORNEYS Patented Jan. 8, 1929.

1,698,364

UNITED STATES PATENT OFFICE.

LOUIS A. HAZELTINE, OF HOBOKEN, NEW JERSEY, ASSIGNOR TO HAZELTINE CORPORATION, A CORPORATION OF DELAWARE.

MEANS FOR ELIMINATING MAGNETIC COUPLING.

Original application filed April 7, 1924, Serial No. 704,629. Patent No. 1,577,421, dated March 16, 1926. Divided and this application filed June 30, 1925. Serial No. 40,488.

This invention relates to wave signaling systems, particularly radio and high-frequency carrier-current or line-radio employing a plurality of coils, and has for its object the provision of means for the elimination of undesirable magnetic coupling between such coils, and further objects hereinafter to be described.

For many electrical purposes, particularly in radio communication systems, it is common to employ coils having an open magnetic circuit of non-magnetic material. The simplest and most readily constructed coil is circular, i. e. all of its turns are coaxial circles except for the effect of the winding pitch. The current in such a coil produces a magnetic flux extending a distance in all directions and in general linking with other coils that may be in the neighborhood, thus giving rise to magnetic coupling between the coils. To avoid such magnetic coupling between two coils, it has been customary to mount them with the axis of one lying in the midplane of the other, the two axes being at right angles. Three coils can be mounted in this way so that there is no coupling between any two, but this result cannot be attained with more than three coils, because no more than three directions mutually at right angles exist in three-dimensional space. Further, this method of mounting is not convenient, as each coil must be mounted in a different manner. Another disadvantage is due to the fact that each coil produces a magnetic field in a different direction and so makes difficult the elimination of magnetic couplings between one or more of the coils with other portions of adjacent circuits or apparatus. An additional method of avoiding magnetic coupling is to enclose each coil completely in a metal compartment or shield, but this more complicated construction is usually not desired because of increased weight and cost and because such shields frequently introduce undesired capacity couplings, and, in addition, introduce eddy-current loss in the metal.

The present invention is shown in its preferred embodiment as being utilized in connection with a radio receiver employing two stages of tuned radio-frequency amplification and a detector, the undesirable capacity coupling between the grid and plate electrodes of the amplifying tubes being neutralized according to Hazeltine U. S. Patents Nos. 1,489,228 and 1,533,858. The invention is of particular value when utilized in such a circuit arrangement because, in order to obtain the maximum benefit from capacity coupling neutralization, it is necessary that interstage magnetic coupling be eliminated except, of course, for the desired coupling in each transformer. The facility with which undesirable magnetic coupling between interstage radio-frequency transformers may be eliminated through the agency of the present invention therefore makes it especially applicable to radio receivers of the type mentioned.

Improved method and means for eliminating magnetic coupling between coils without introducing the objections mentioned above are described in Hazeltine U. S. Patent No. 1,577,421, issued March 16, 1926, of which this application is a division, wherein it is demonstrated that if any number of coils be arranged in a row, the axes of the coils being in the same plane and similarly inclined to a common reference line intersecting the coils, magnetic coupling between the coils may be substantially eliminated. That invention is especially applicable to radio receiving apparatus employing successive tuned circuits, wherein it is customary to employ coils each one being tuned by an associated variable condenser.

It is explained in the application last referred to that in order to obtain the advantages of that invention, it is necessary that the coils, between which there would otherwise be undesirable magnetic coupling, be placed so that the centers of the coils lie in the same straight line, with the axes parallel and at an angle of approximately 55° to the line of centers of the coils. In addition, it is stated that it is necessary to make as short as possible the leads connecting each transformer or coil with its associated tuning condenser; the reason for the latter requirement being that loops formed by connecting leads, if more than a few inches in length, are likely to set up conflicting stray magnetic fields and to introduce stray capacity couplings which may seriously interfere with the desired elimination of coupling as described.

The present invention provides simple and efficient means for obtaining the full advantages of the invention referred to by providing a tuning unit comprising a coil and tuning condenser so associated as to be mechanically strong and electrically efficient. By thus mounting each coil rigidly upon its tuning condenser, which in turn may be secured to a panel, as illustrated in the drawings, the coils may readily be placed automatically at the correct angle to eliminate undesired magnetic coupling in the manner described, with the assurance that this angle will be permanently maintained. In addition, this unit introduces other improvements which will now be described in detail.

Referring to the drawings,

Fig. 1 illustrates a detail side view of a condenser-transformer tuning unit;

Fig. 2 is a top view of a radio receiver containing three tuning units substantially similar to that shown in Fig. 1; and Fig. 3 is a circuit diagram of a complete radio receiver, a view of which is given in Fig. 2.

Referring to Fig. 1, there is illustrated a variable air condenser 1, which, by means of short brackets 2 and 8, supports transformer 3. This transformer comprises primary winding 4 closely coupled to a secondary winding 5, the variable condenser being here connected in parallel with the secondary winding. This tuning unit is complete in itself, and may be rapidly assembled according to standardized specifications. In assembling radio receivers, of which Figs. 2 and 3 are illustrative of but one example, two or more units such as shown in Fig. 1 may readily be mounted upon the control panel 6 of the receiver at the proper angle, previously referred to, by means of suitably located mounting holes which preferably should have been drilled with the aid of a template. It will thus be appreciated that by arranging the tuning units as shown, the correct angle for eliminating undesirable magnetic coupling may be arrived at with minimum labor, because the placing of the condenser-coil units all on the same panel will automatically locate the coils with their centers on the same straight line and with their axes at approximately the correct angle to that line, the only additional adjustment being a small one which may be made during the final testing of the receiver, such as by moving the brackets 2 and 8 in the proper direction beneath the retaining nuts 7, Fig. 1. The primary circuits in which these units may be included usually have relatively small capacities, and the primary coils much fewer turns than the secondary coils, hence the radio-frequency currents in the primary circuit have a very small magnetic effect as compared with the radio-frequency currents in the secondaries. It is therefore the secondary coils which particularly should have zero magnetic coupling.

Furthermore, by mounting the coils on the back of the variable condensers through the agency of short brackets 2 and 8, the coils are securely held in a position which allows of extremely short connecting leads between the coil and the tuning condenser, thus eliminating possible magnetic loops, and likewise reducing possible capacity couplings between stages. These short leads are represented in Fig. 1 by insulated wire 9 and bracket 8, the latter serving both as a support and an electrical conductor. The condenser plates are thereby also placed in such a position relative to the magnetic field of the coils that a minimum eddy-current loss results.

Tuning units as described herein are of advantage not only from the standpoint of commercial practice, wherein the factory assembly of receivers is greatly facilitated, but in addition are of great value to the amateur constructor who is thus enabled to procure a complete tuning element comprising a variable condenser with a single coil, or transformer including a plurality of coils, which has been accurately designed for efficient operation, and allows of compact assembly and simplicity of external connections.

It will be readily understood that the merits of this invention are applicable with equal value to single coils and multi-coil transformers as illustrated herein, as well as to coils or transformers of non-cylindrical shape such as so-called "basket-weave", "pan-cake" and other special forms of coils.

It will also be understood that the term "panel" as employed in the appended claims may be defined as any common support upon which the tuning units may be mounted.

I claim:

1. A physically compact unit adapted to tune at least one oscillatory circuit of a wave signaling device, comprising a variable condenser having mounted thereon an inductance coil connected to said condenser, said condenser including a plurality of plates, said coil being secured in close proximity to said condenser and so positioned relative thereto that the magnetic field of said coil produces substantially a minimum of eddy currents in said plates.

2. In a radio receiver, a plurality of condenser-coil units each adapted to tune at least one radio-frequency circuit thereof, each of said units comprising a variable tuning condenser and an inductance coil, said coil being disposed in such close proximity to said condenser as to permit of short conducting leads for interconnecting said coil with said condenser, thereby minimizing undesired reactions between said units resulting from the magnetic and electrostatic couplings between the leads of one unit and those of another, said condensers being mounted in a row on a common supporting panel and said coils being mounted upon said condensers by supporting means such that said coils are so orientated with respect to each other that there is substantially zero magnetic coupling between them.

3. In a radio receiver including a multi-stage tuned radio-frequency amplifier, a plurality of tunable interstage coupling units each comprising a coupling transformer and a tuning condenser combined to form a self-contained unitary structure in which the transformer is mounted upon and supported by the condenser and is electrically connected therewith by short leads, whereby undesired stray capacity and magnetic couplings are minimized, said unitary structures being identical and all mounted in a row on a common supporting panel, the magnetic centers of said transformers being disposed substantially in a straight line, and the magnetic axis of each of said transformers being disposed at an angle of approximately 55° to said straight line, whereby there is substantially zero magnetic coupling between said transformers.

4. In a radio receiver including a multi-stage tuned radio-frequency amplifier, the combination of a panel and a plurality of tuning units mounted thereon in a straight line, each unit including an inductance coil and a variable tuning condenser combined to form a self-contained unitary structure in which the coil is mounted upon the condenser by supporting means, said means effecting an orientation of said coils in relation to their respective condensers such that there is substantially zero magnetic coupling between said coils.

5. In a radio receiver, a multi-stage tuned radio-frequency amplifier including a plurality of tunable interstage coupling units mounted on a panel in a straight line, each unit including a coupling transformer and a variable tuning condenser combined to form a self-contained unitary structure in which the transformer is mounted upon the condenser by supporting means which so orientate said transformers in their relation to their respective condensers and to each other that there is substantially zero magnetic coupling between said transformers.

6. A self-contained unitary structure comprising a variable tuning condenser and a coupling transformer attached to and supported by said condenser, said condenser including a rotatable operating shaft carrying condenser plates, the magnetic axis of said coupling transformer being disposed substantially parallel to said plates, whereby a minimum of eddy-current losses occurs in said plates.

7. A self-contained unitary structure adapted to be mounted upon a panel, said structure comprising a variable tuning condenser and a coupling transformer attached to and supported by said condenser, said condenser including a rotatable operating shaft carrying condenser plates, the magnetic axis of said coupling transformer being disposed substantially parallel to said plates whereby a minimum of eddy-current losses occur in said plates, the orientation of the transformer and condenser of said structure being such that the mounting in combination of a plurality of unitary structures, as above defined, upon a supporting panel, in a straight line, and with the axes of said operating shafts parallel to each other results in the substantial elimination of magnetic coupling between said transformers.

8. A self-contained unitary structure adapted to be mounted upon a panel, said structure comprising a variable tuning condenser and a coupling transformer attached to and supported by said condenser, said condenser including a rotatable operating shaft carrying condenser plates, the magnetic axis of said coupling transformer being disposed substantially parallel to said plates whereby a minimum of eddy-current losses occurs in said plates, the orientation of the transformer and condenser of said structure being such that the mounting in combination of a plurality of unitary structures, as above defined, upon a supporting panel, in a straight line, with the axes of said operating shafts parallel to each other, with the magnetic axes of said transformers parallel to each other and similarly inclined with respect to a straight line passing thru their magnetic centers, results in the substantial elimination of magnetic coupling between said transformers.

9. In a radio receiver including a multi-stage tuned radio-frequency amplifier, the combination of a plurality of tuning units mounted in a row upon a common support, each unit including an inductance coil and a variable tuning condenser combined to form a self-contained unitary structure in which the coil is mounted upon the condenser by supporting means, said condensers being similarly secured to said support, said supporting means effecting an orientation of said coils in relation to their respective condensers and to each other, such that there is substantially zero magnetic coupling between said coils.

10. In a radio receiver, a multi-stage tuned radio-frequency amplifier including a plurality of tunable interstage coupling units mounted in a row upon a common support, each unit including a coupling transformer and a variable tuning condenser combined to form a self-contained unitary structure in which the transformer is mounted upon the condenser by supporting means, said condensers being similarly secured to said support, said supporting means effecting an orientation of said transformers in relation to their respective condensers and to each other such that there is substantially zero magnetic coupling between said transformers.

In testimony whereof I affix my signature.

LOUIS A. HAZELTINE.